United States Patent [19]

Traugott et al.

[11] Patent Number: 5,446,103
[45] Date of Patent: Aug. 29, 1995

[54] MALEIMIDE-MODIFIED HIGH HEAT ABS RESINS

[75] Inventors: Thomas D. Traugott, Sanford; Shari L. Workentine, Midland, both of Mich.

[73] Assignee: The Dow Chemical Company, Midland, Mich.

[21] Appl. No.: 341,717

[22] Filed: Nov. 18, 1994

Related U.S. Application Data

[62] Division of Ser. No. 127,726, Sep. 27, 1993, Pat. No. 5,412,036.

[51] Int. Cl.$^6$ .............. C08F 279/02; C08L 51/04
[52] U.S. Cl. .............. 525/282; 525/53; 525/71
[58] Field of Search .............. 525/282, 53, 71

[56] References Cited

U.S. PATENT DOCUMENTS

| | | | |
|---|---|---|---|
| 4,808,661 | 2/1989 | Iwamoto et al. | 525/73 |
| 5,091,470 | 2/1992 | Wolsink et al. | 525/71 |

FOREIGN PATENT DOCUMENTS

| | | |
|---|---|---|
| 2175740 | 7/1990 | Japan . |
| 2265911 | 10/1990 | Japan . |

*Primary Examiner*—Vasu S. Jagannathan
*Attorney, Agent, or Firm*—James B. Guffey

[57] ABSTRACT

Graft copolymerized maleimide-modified, impact resistant monovinylidene aromatic copolymer compositions have substantially improved impact strength and fatigue resistance properties when the swelling index thereof is 12 or greater and when the numerical difference in maleimide monomer content as between the grafted copolymer and matrix copolymer portions thereof differ by no more than 9 percentage points from each other. Such compositions are conveniently prepared by mass, solution or mass/suspension graft copolymerization processes and by deferring the addition of at least about 30 percent of the maleimide monomer ingredient to a point in the process after (and preferably only shortly after) phase inversion of the dissolved impact modifying rubbery polymer ingredient.

9 Claims, No Drawings

MALEIMIDE-MODIFIED HIGH HEAT ABS RESINS

CROSS-REFERENCE TO RELATED APPLICATION

This is a divisional of application Ser. No. 08/127,726, filed Sep. 27, 1993, now U.S. Pat. No. 5,412,036.

BACKGROUND OF THE INVENTION

This invention pertains generally to impact resistant monovinylidene aromatic copolymer compositions such as those that are commonly known in the art as ABS resins. In particular, said invention pertains to rubber-modified monovinylidene copolymers which can, for example, be prepared by mass, solution or mass/suspension graft copolymerization techniques and which have incorporated (i.e., copolymerized) therein one or more N-substituted maleimide monomers for the purpose of enhancing the heat resistance (e.g., the softening point, heat distortion temperature, etc.) of the resulting graft copolymer product.

Maleimide-modified, impact resistant styrenic copolymer compositions are already known in the art as a general proposition. For example, in U.S. Pat. No. 3,652,726 there are disclosed certain graft copolymers comprising a diene rubber substrate and a superstrate resin comprising acrylonitrile, N-aryl maleimide and an aromatic olefin, such as styrene. Also disclosed are blends of such graft copolymer with various compatible matrix resins. The reference further teaches at col. 6, line 70, that the graft copolymers may be made by a sequential polymerization in which the monomers for the superstrate are polymerized by a free radical process. Bulk, suspension, solution, or emulsion polymerizations are all disclosed as suitable for preparing such polymers. Emulsion techniques are particularly exemplified.

More recently (i.e., in U.S. Pat. No. 4,808,661) there have been disclosed maleimide-modified ABS-type compositions that are prepared by continuous bulk (or mass) polymerization techniques and which are required to meet certain specified criterion and compositional characteristics in order to provide the balance of performance properties which are contemplated for the specific purposes of that patent. In particular, such patent includes the requirements that:

1. the occluded and/or grafted styrene/acrylonitrile/maleimide (S/AN/MI) polymer contained in or on the dispersed rubbery polymer be in the range of 50 to 100 parts per 100 parts of the rubbery polymer;
2. the amount of maleimide in both the grafted/occluded polymer (x) and the continuous matrix phase (y) be in the 1 to 25 weight percent range;
3. the ratio of y:x be greater than 0.5 and less than 2.0; and
4. the crosslinking degree index (hereinafter also referred to as swelling index) thereof be in the range of from 4 to 11.

SUMMARY OF THE INVENTION

It has now been discovered that substantially improved properties (particularly impact strength and fatigue resistance) are obtained in maleimide-modified, impact resistant monovinylidene aromatic copolymer compositions of the sort described above when said compositions have or are caused to have swelling index values of 12 or greater. Such finding is considered to be especially surprising in view of the contrary teachings of U.S. Pat. No. 4,808,661 (i.e., at Col. 7, lines 41–43 thereof) to the effect that the impact strength of such compositions is reduced when the swelling index thereof exceeds 11.

It has additionally been discovered that the impact strength of the subject maleimide-modified copolymer compositions is also notably improved by ensuring that the maleimide monomer content as between the continuous matrix phase ("Y" in weight percent on a matrix phase weight basis) and the grafted/occluded copolymer constituent ("X" in weight percent on a grafted/occluded copolymer weight basis) of such copolymer compositions is sufficiently balanced such that the numerical difference therein (i.e., the absolute value of X-Y) is no more than 9 weight percentage points.

In light of the foregoing discoveries, the present invention in one of its aspects is a rubber-modified monovinylidene aromatic copolymer composition which comprises:

A. a continuous phase matrix copolymer comprising, in polymerized form and on a matrix copolymer weight basis, from about 35 to about 89 weight percent of a monovinylidene aromatic monomer, from about 10 to about 40 weight percent of an ethylenically unsaturated nitrile monomer, and from about 1 to about 25 weight percent of an N-substituted maleimide monomer; and B. dispersed within said matrix copolymer, discrete rubber particles having grafted thereon and occluded therein a rigid copolymer constituent comprising, in polymerized form and on a rigid copolymer constituent weight basis, from about 25 to about 94 weight percent of a monovinylidene aromatic monomer, from about 5 to about 40 weight percent of an ethylenically unsaturated nitrile monomer, and from about 1 to about 35 weight percent of a N-substituted maleimide monomer; said rubber-modified monovinylidene aromatic copolymer composition being further characterized in that it has a swelling index value of at least 12 and in that the difference between the N-substituted maleimide monomer content of the matrix phase copolymer and that of the grafted and occluded rigid copolymer constituent is 9 weight percentage points or less.

In another of its aspects, the present invention resides in a process for preparing an improved maleimide-containing, rubber-modified monovinylidene aromatic copolymer composition. Said process comprises the steps of:

A. dissolving a rubbery polymer material in a monomer mixture comprising a monovinylidene aromatic monomer, an ethylenically unsaturated nitrile monomer and, optionally, an N-substituted maleimide monomer;

B. partially polymerizing the resulting solution of said rubbery polymer material in said monomer mixture;

C. adding an N-substituted maleimide monomer to the partially polymerized solution of said rubbery polymer material in said monomer mixture when at least 20 weight percent of said monomer mixture has been converted from monomer to polymer;

D. continuing to polymerize the partially polymerized reaction mixture of step (C) to the desired degree of polymerization; and E. removing any unreacted monomers from the product of step D at elevated temperature and reduced pressure and under conditions such that the swelling index of the resulting rubber modified polymer product is 12 or greater.

As has been noted above, the resulting rubber-modified copolymer compositions have improved fatigue resistance and impact strength properties relative to otherwise comparable compositions which have swelling indexes of less than 12. Said compositions also exhibit superior impact strength properties when compared to compositions which are essentially the same in all respects except for having maleimide monomer content differences of greater than 9 weight percentage points as between the matrix phase copolymer and the grafted/occluded rigid phase copolymer portions thereof.

"Swelling index" as used herein provides a measure of the degree of crosslinking within the dispersed grafted rubber particles of the polymer composition of interest. It is determined for a given rubber-modified copolymer by partially dissolving 0.4 grams of the copolymer in question in 30 cc of a 70:30 volume ratio solvent mixture of toluene and methyl ethyl ketone and thereafter centrifuging the resulting mixture to remove the undissolved material from it. The undissolved material (which does not dissolve due to rubber crosslinking and which will have been caused to swell due to solvent absorption) is then weighed to determine its initial "wet" or swollen weight; dried in a vacuum to remove all of the solvent therefrom; and thereafter is weighed again to determine the dry weight thereof.

The swelling index is then calculated as the ratio of the wet weight to the dry weight as determined by the foregoing procedure. That is, $$\text{Swelling Index} = \frac{\text{Wet or Swollen Sample Weight}}{\text{Dry Sample Weight}}$$

As is noted above, the swelling index value provides a measure of the relative degree of crosslinking which is present in the dispersed rubbery polymers of the composition in question. The more highly crosslinked the rubber particle is, the less is its capability for swelling and absorbing larger quantities of solvent. Accordingly, relatively lower swelling index values correspond to relatively higher degrees of crosslinking within the indicated dispersed, grafted rubber particles.

Conversely, little or no rubber crosslinking in the sample of interest either results in there being little or no insoluble matter following dissolution thereof in the mixed toluene/methyl ethyl ketone solvent system or results in a relatively high swelling index value such as for example 30 or 40 or more.

For the purposes of the present invention, the percentage of the N-substituted maleimide monomer contained in the grafted and occluded rigid copolymer constituent can be determined as follows:

1. Add 30 ml of a 70/30 volume ratio mixture of methyl ethyl ketone (MEK)/methanol to 1.0 gm of the resin to be analyzed and shake the mixture for at least hours.
2. Centrifuge at 19,500 RPM and 5° C. for 2 hours.
3. Pour off the supernatant.
4. Dry the remaining gel phase at 150° C. and ambient pressure for 30 minutes, and at 150° C. and 5 mm Hg pressure (absolute) for 60 minutes.

$$GCP^* = \frac{\text{Graft + Occlusions}}{\text{Rubber}} =$$

$$\left[\frac{\text{(Weight of dried gel phase)}}{\text{(Weight of original sample) (\% rubber/100)}} - 1\right](100)$$

*Grafted and Occluded Copolymer Percentage

5. Elemental analysis of the gel phase for oxygen content will then allow determination of the percent of N-substituted maleimide monomer contained in the graft and occlusions.

The percentage of N-substituted maleimide monomer contained in the matrix phase can be ascertained by first determining the total maleimide monomer content in the overall resin sample via Fourier Transform Infrared Spectroscopy (FTIR) and then subtracting out the amount which has been found via the above-presented procedure to have been polymerized into the grafted and occluded copolymer.

DETAILED DESCRIPTION OF THE INVENTION

Monovinylidene aromatic monomers suitable for use in both the matrix phase portion and in the grafted and occluded portion of the subject copolymer compositions include styrene, α-methylstyrene, p-vinyltoluene, p-t-butylstyrene, etc. Especially preferred for such usage is styrene.

The amount of monovinylidene aromatic monomer contained in the indicated matrix phase copolymer and in the grafted/occluded rigid copolymer portion is typically from about 25 to about 94 weight percent (based upon the weight of the respective copolymer components) and is more preferably in the range of from about 35 to about 89 (especially from about 50 to about 85) weight percent.

Ethylenically unsaturated nitrile monomers suitable for use herein include acrylonitrile and lower alkyl substituted derivatives thereof such as methacrylonitrile, ethacrylonitrile, etc. with acrylonitrile being especially preferred in most instances. While not being particularly critical for the purposes of the present invention, the ethylenically unsaturated nitrile monomer content within the matrix and grafted/occluded copolymer portions of the subject polymer composition is typically in the range of from about 5 to about 40 weight percent and is preferably in the 10 to about 40 (especially from about 15 to about 30) weight percent range.

N-substituted maleimide monomers suitable for use herein include N-alkyl maleimides such as N-methylmaleimide, N-ethylmaleimide, N-propylmaleimide, N-isopropylmaleimide, N-t-butylmaleimide, etc.; N-cycloalkylmaleimides such as N-cyclohexylmaleimide; N-arylmaleimides such as N-phenylmaleimide, N-naphthylmaleimide, etc.; and the like.

Typically, the indicated N-substituted maleimide monomer will constitute from about 1 to about 35 (preferably from about 1 to about 25 and especially from about 5 or 10 to about 20) weight percent of the respective matrix copolymer and grafted/occluded copolymer constituents.

As has been mentioned above, one key feature of the present invention resides in assuring that the N-substituted maleimide monomer content is reasonably well balanced (i.e., numerically differing by 9 weight percentage points or less) as between the matrix copolymer portion and the grafted/occluded rigid copolymer portion of the subject polymer composition.

Preferably, the N-substituted maleimide contents of the indicated matrix and grafted/occluded copolymer components differ from each other by no more than about 8 (especially no more than about 7) weight percentage points. As is noted above and as is seen in the hereinafter presented working examples, the impact strength of the indicated polymer compositions (i.e., at a given rubber content and rubber particle size) is substantially decreased when the maleimide content difference between the two phases exceed the aforementioned values.

A second key feature of, or requirement for, the subject polymer compositions is that the swelling index thereof (i.e., reflecting the degree of crosslinking within the dispersed rubber particles thereof) be at least 12. As is illustrated in the working examples which follow, the impact strength and fatigue resistance characteristics of such compositions are substantially improved at swelling index values in the range indicated as compared to that which is attained at lower swelling index values. Preferably, the swelling index value of the subject polymer composition is in the range of from about 15 to about 20 or 25.

When preparing the compositions hereof by generally known mass, solution or mass/suspension polymerization techniques, the swelling index of the resulting compositions is largely controlled by the type and amount of polymerization initiator employed therein and upon the temperature and residence time utilized in removing residual volatile materials from the polymerized reaction mixture. Thus, for the purposes of the present invention, it is important to select and control those parameters in a fashion such that the aforementioned swelling index requirement is met in the resulting polymer composition.

As is typical of conventional mass, solution or mass/-suspension polymerized ABS polymer compositions, the rubber content of the subject impact modified styrenic copolymer compositions generally falls within the range of from about 5 to about 30 (more preferably from about 7 to about 25 and especially about 9 to about 21) weight percent on a total composition weight basis.

As is also typical of rubber-modified polymers prepared in the foregoing fashion, the dispersed rubber particles of the present polymer compositions, when prepared by mass, solution or mass/suspension graft polymerization techniques, will generally have a volume average particle size within the range of from about 0.5 to about 5 (preferably from about 0.8 to about 3) micron.

Rubbery polymer materials suitable for use in preparing the subject impact-modified monovinylidene aromatic copolymers include homopolymers of conjugated diene monomers such as 1,3-butadiene, isoprene, etc. and copolymers of such diene monomers with up to about 40 weight percent of copolymerizable monoethylenically unsaturated monomers such as monovinylidene aromatic monomers, ethylenically unsaturated nitrile monomers, $C_1$–$C_4$ alkyl acrylate or methacrylate monomers, etc. Such rubbery polymer materials generally have a glass transition temperature (Tg) of less than 0° C. and, most preferably, the Tg thereof is less than −20° C. for the present invention's purposes.

Preparation of the subject polymer compositions is suitably conducted generally in accordance with known mass, solution or mass/suspension polymerization techniques. Thus, the indicated rubbery polymer is initially dissolved in a monomer mixture containing the desired monomer materials and optionally containing an organic solvent or diluent and the resulting rubbery polymer/monomer solution is polymerized (partially) to a point at which phase inversion occurs (i.e., at which the dissolved rubbery polymer comes out of the solution and takes the form of discrete rubber particles dispersed within the polymerizing monomer mixture). Polymerization of the resulting heterogeneous (i.e., two phase) mixture is then continued until the desired degree of monomer-to-polymer conversion has been achieved and the resulting reaction mixture is then devolatilized (typically under elevated temperature and reduced pressure conditions) to remove any residual monomer materials (and any diluent used in the process) and to thereby recover the desired graft copolymer product.

Although the present invention may be practiced in a batch polymerization process, it is preferably conducted in a continuous fashion in either a backmixed or a plug flow (non-backmixed) reactor. One such suitable process employs one or more well stirred tubular reactors. Desirably, the polymerization is conducted in a train consisting of two and preferably three plug flow, stirred tube reactors connected in series. Phase inversion preferably occurs in the first reactor and the polymerizing mixture is discharged from the first reactor into the second reactor and subsequent reactors. In the remaining reactors polymerization is continued in the presence of agitation to the desired final degree of polymerization.

In conducting the indicated polymerization process, it has been observed that the N-substituted maleimide monomer employed therein exhibits a relatively rapid rate of polymerization. As a result, there tends to be a substantial "composition drift" (i.e., in terms of N-substituted maleimide monomer content) as between copolymer formed during the early stages of the polymerization (e.g., grafted and occluded copolymer and some of the matrix phase copolymer) and that portion of the continuous matrix phase copolymer which is formed later in the process.

Thus, for example, it has been found that in those instances wherein all of the N-substituted maleimide monomer component is charged to the graft polymerization process at or near the very beginning thereof, the difference in the maleimide monomer content as between the respective grafted/occluded copolymer and matrix copolymer portions will typically be in the range of 10 weight percentage points or more and can quite commonly be in the range of 13 to 15 weight percentage points or more.

Accordingly, in order to ensure that the maleimide monomer contents of the respective grafted/occluded and matrix copolymer phases are sufficiently balanced for the purposes of this invention, the subject polymer compositions are prepared by withholding at least a portion (e.g., from about 20 to 100 weight percent and preferably from about 30 to about 75 weight percent) of the N-substituted maleimide 5 monomer from the initial monomer charge and by deferring the addition thereof until later in the polymerization process.

Typically, it is advantageous to introduce the deferred maleimide monomer charge or feed stream at a point in the process at which at least 20 percent (and preferably at least 25 or 30 percent) of the original monomer charge has been converted from monomer to polymer.

Most preferably, the indicated deferred maleimide monomer addition is conducted at a stage in the graft polymerization process which is after (and preferably only shortly after) the rubber phase inversion which has been described above has already occurred.

It is also generally preferred that the indicated deferred maleimide monomer addition be conducted at stage in the process which is prior to 60 (more preferably prior to 50) percent conversion of the original monomer charge or feed stream.

Typically, the aforementioned graft polymerization process will be conducted at a temperature in the range of from about 80° to about 180° C. and will employ an effective amount (e.g., from about 50 to about 200 ppm) of a conventional polymerization initiator such as, for example, 1,1-bis (t-butylperoxy) cyclohexane, dicumylperoxide, t-butylperoxy-2-ethylhexanoate, etc.

Devolatilization of the resulting reaction mixture (i.e., to recover the desired graft copolymer product) is typically conducted at a temperature in the range of from about 200° to about 300° C.; at a pressure of about 30 millimeters of mercury (absolute) and for a residence time of from about 0.2 to about 1.5 hours.

As will undoubtedly be readily-apparent to those skilled in the art, the subject mass, solution or mass/suspension graft copolymer compositions hereof can be readily compounded with other conventional ingredients such as pigments, mold release agents, halogenated fire retardant ingredients, fillers, reinforcing materials, blowing agents, other thermoplastic resin ingredients, etc. as may be desired in a given instance.

In one such preferred embodiment hereof, the indicated maleimide-modified mass, solution or mass/suspension graft copolymer is melt compounded with from about 5 to about 40 weight percent (on a total composition weight basis) of an emulsion graft polymerized rubber concentrate material in order to further enhance the impact strength and toughness characteristics of the resulting polymer composition. Said grafted rubber concentrate typically contains from about 30 to about 70 weight percent of dispersed rubber particles (usually having volume average particle sizes in the range of from 0.05 to about 1, preferably from about 0.1 to about 0.6, micron) having grafted thereto a rigid superstrate copolymer of a monovinylidene aromatic monomer, an ethylenically unsaturated nitrile monomer and, optionally, an N-substituted maleimide monomer.

The present invention is further illustrated and understood by reference to the following working examples in which all parts and percentages are stated on a weight basis unless otherwise indicated. Within such working examples, the various physical properties and characteristics of the resulting polymer compositions were determined as indicated below:

Izod Impact—ASTM D256-87 using injection molded test specimens
Tensile (Tm, Ty, Tr, %E)—ASTM D638-87b using injection molded specimens
Instrumented Dart Drop—ASTM D3763-86 (Injected molded specimens)
Distortion Temperature Under Load (DTUL)—ASTM D648-82
Vicat—ASTM D1525-87
Melt Flow Rate (MFR)—ASTM D 1238-86
Gloss—ASTM D523-89
Molecular Weight (Mw, Mn)—Determined by Gel Permeation Chromatograph (GPC)
Reduced Viscosity—Determined as described at Column 4, lines 40-45 of U.S. Pat. No. 4,808,661
Fatigue—Tensile fatigue testing using double notched, compression molded ASTM tensile bars at 1 cycle per second, peak load of 1,500 psi and minimum:maximum load ratio of 0.1.

EXAMPLE 1

A continuous solution polymerization process is conducted utilizing three well stirred reactors connected in series. Each reactor is capable of holding 2.8 lbs (1.27 Kg) of reaction mixture and all three of them are operated at full volumetric capacity. A main monomer feed stream comprising styrene (61 percent) and acrylonitrile (14.9 percent) having dissolved therein 8.8 percent polybutadiene rubber (Diene 55, available from the Firestone Tire and Rubber Company), 15.4 percent ethylbenzene solvent, 0.2 percent hindered phenolic antioxidant (Irganox 1076), 138 parts per million initiator, 1,1-bis(t-butyl peroxy)cyclohexane, and 100 parts per million of chain transfer agent (n-dodecyl mercaptan) is introduced to the first reactor at a rate of 0.78 lb/hr. (0.35Kg/hr) A second monomer stream containing 40.3 percent acrylonitrile, 26.8 percent N-phenylmaleimide (N-PMI) and 32.9 percent ethylbenzene solvent is added at three points in the polymerization where the main monomer feedstream conversion fraction is 0.084, 0.332 and 0.411. The total amount of this stream (i.e., the so-called "Split N-PMI Addition" feed stream) is 0.079 lb/hr (0.036 Kg/hr) and is added in equal amounts at each of the three points of addition. An additional 900 parts per million of chain transfer agent (on a main monomer feedstream basis) is added at the point in the reactor train where monomer conversion is 0.332. The first reactor is maintained at an average temperature of 104° C. with stirring. Phase inversion occurs in the first reactor (at a point where monomer conversion is approximately 17 percent) and the effluent is charged to the second reactor in the series. The temperature of the second reactor is maintained at 125° C. The product from the second reactor is charged to the third reactor which is maintained at a temperature of 145° C. The final product is devolatilized to remove unreacted monomer and solvent and is then pelletized. The properties of the resulting polymer are shown in Table 1.

Comparative Example 1-A

The polymerization process and reaction conditions of Example 1 are substantially repeated with the exception that all the N-phenylmaleimide is added in the monomer feed stream before it enters the first polymerizer. The properties of the resulting polymer are shown in Table 1.

Comparative Example 1-B

The graft copolymer of Example 1 is fed to a twin screw extruder operating at an average temperature of 200° C. along with 0.1 percent of 2,5-dimethyl-2,5-di-(t-butyl peroxy) hexane (Lupersol 101) in order to further crosslink the rubber component thereof and to thereby reduce the swelling index of the resulting composition.

The properties of the resulting polymer are shown in Table 1.

Comparative Example 1-C

The graft copolymer of Comparative Example 1-A is also fed to a twin screw extruder operating at an average temperature of 200° C. along with 0.1 percent of 2,5-dimethyl-2,5-di-(t-butyl peroxy) hexane (Lupersol 101) to reduce the swelling index of that graft copolymer. The properties of the resulting polymer are shown in Table 1.

EXAMPLE 2

Example 1 is substantially repeated with the exception that the main monomer feed stream contains 53.6 percent styrene, 16.8 percent acrylonitrile, 0.9 percent N-phenylmaleimide, 12.0 percent of a styrene-butadiene diblock rubber (Stereon 730A from Firestone Tire and Rubber Company) and 16.4 percent ethylbenzene solvent. The second monomer stream is identical in composition to Example 1 and is added at the same points of conversion as in Example 1 but at a total rate of 0.095 lb/hr. The properties of the resulting polymer are shown in Table 1.

Comparative Example 2

The graft copolymer of Example 2 was fed to a twin screw extruder operating at an average temperature of 200° C. along with 0.1 percent of 2,5-dimethyl-2,5-di-(t-butyl peroxy) hexane (Lupersol 101) to crosslink the rubber particles thereof and to thus reduce the swelling index of the resulting polymer composition. The properties of the resulting polymer are shown in Table 1.

Comparative Example 2), the graft copolymer compositions of the present invention (i.e., having a swelling index of at least 12) have notably improved fatigue resistance and impact strength relative to comparable compositions that have swelling indexes of less than 12.

EXAMPLE 3

Example 1 is substantially repeated with the exception that the main monomer feed stream contains 59.3 percent styrene, 14.2 percent acrylonitrile, 6.3 percent N-phenylmaleimide, 6.0 percent Diene 55 polybutadiene rubber and 14.3 percent ethylbenzene solvent. The second monomer stream is identical in composition to that of Example 1 and is added in equal amounts at conversion points of 0.3 and 0.4 at a total rate of 0.13 lb/hr (0.059 Kg/hr). The resulting graft copolymer is compounded with 19% of a grafted rubber concentrate for additional impact resistance and 1% of a bis-stearamide wax. The properties of the resulting polymer are shown in Table 2. The grafted rubber concentrate employed in this example is one in which styrene and acrylonitrile (in a 70:30 weight ratio) have been emulsion graft polymerized to a 93:7 weight ratio butadiene/styrene copolymer latex. Such grafted rubber concentrate has a rubber content of 52 weight percent, a volume averaged particle size of 0.15 micron and a grafted copolymer to rubber ratio of 0.3.

Comparative Example 3-A

Example 3 is substantially repeated with the exception that the main feed, containing styrene (50.7 percent) and acrylonitrile (17.9 percent) having dissolved therein 5.1 percent polybutadiene Diene 55 rubber, 17.0

TABLE I

| Experiment Number | Example 1 | Comparative Example 1-A | Comparative Example 1-B | Comparative Example 1-C | Example 2 | Comparative Example 2 |
|---|---|---|---|---|---|---|
| Split N-PMI Addition* | Yes | No | Yes | No | Yes | Yes |
| Percent of total N-PMI added after phase inversion | 66.7 | None | 66.7 | None | 51 | 51 |
| Swelling Index | 16.4 | 15 | 10.1 | 9.55 | 18.2 | 10.1 |
| Mw | 164,100 | 170,900 | 145,200 | 146,300 | 147,300 | 124,600 |
| Mn | 64,080 | 63,670 | 59,500 | 57,260 | 64,140 | 56,140 |
| Reduced Viscosity (cm3/g) | 0.79 | 0.75 | 0.70 | 0.71 | na | na |
| MFR (g/10 min) | 3 | 2.3 | 4.1 | 3.7 | 2.89 | 4.1 |
| Tm (psi) | 305,000 | 355,000 | 305,000 | 312,000 | 288,000 | 263,000 |
| Ty (psi) | 5907 | 6236 | 5937 | 6282 | 6484 | 6333 |
| Tr (psi) | 4936 | 5028 | 5287 | 5407 | 5160 | 5374 |
| % Elongation (%) | 56.9 | 17 | 75.5 | 25.2 | 25.1 | 49.6 |
| Vicat/DTUL (°F.) | 236/180 | 237/190 | 236/182 | 241/186 | 235/172 | 232/174 |
| Izod (ft lb/in) | 2.76 | 1.82 | 1.89 | 1.4 | 3.76 | 2.02 |
| Dart Impact RT (total) (in-lb) | 197 | 106 | 133 | 92 | 333 | 210 |
| Dart Impact −20° F. (total) (in-lb) | 112 | 76 | 54 | 43 | 87 | 77 |
| Gloss | 65 | 70 | 51 | 53 | 66.5 | 51.2 |
| Fatigue (cycles to fail) | 6140 | na | 4440 | na | 9100 | 5600 |

*Connotes post-phase inversion addition of at least a portion of the N-PMI monomer.

As can be seen from the results in Table 1, the addition of at least a portion of the N-phenylmaleimide (N-PMI) monomer component at a later stage in the polymerization process (i.e., after the point of rubber phase inversion as in the case of Examples 1 and 2) provides notably improved impact strength results relative to those which are obtained by adding all of N-PMI monomer in the beginning stages of the polymerization process (i.e., pre-phase inversion).

As can also be seen (i.e., by comparing Example 1 with Comparative Example 1B and Example 2 with percent ethylbenzene solvent, has all of the N-phenylmaleimide monomer (9.3 percent)added to it before it enters the first polymerizer. This graft copolymer is also compounded with 19 percent of the grafted rubber concentrate of Example 3 above for additional impact resistance and 1 percent of a bis-stearamide wax. The properties of the resulting polymer are shown in Table 2.

Comparative Example 3-B

The polymerization process of Example 1 is substantially repeated with the exception that the main monomer feed stream contains styrene (65 percent), acrylonitrile (11.6 percent) and N-phenylmaleimide (4.4 percent) having dissolved therein 6.6 percent Diene 55 polybutadiene rubber and 12.5 percent ethylbenzene solvent. The second monomer stream is identical in composition to Example 1 and is added at the same points of conversion but at a total rate of 0.2 lb/hr (0.091 Kg/hr). The resulting graft copolymer is melt compounded with 19 percent of the grafted rubber concentrate of Example 3 above for additional impact resistance and 1 percent of a bis-stearamide wax. The properties of the resulting polymer are shown in Table 2.

EXAMPLE 4

Example 1 is substantially repeated with the exception that the main monomer feed stream contains 62.1 percent styrene, 12.9 percent acrylonitrile and 5.4 percent N-phenylmaleimide, 6.2 percent Diene 55 polybutadiene rubber and 13.4 percent ethylbenzene solvent. The second monomer stream is identical in composition to Example 1 and is added in equal amounts at main monomer feed conversion points of 0.3 and 0.4 at a total rate of 0.17 lb/hr (0.077 Kg/hr). The resulting graft copolymer is compounded with 19 percent of grafted rubber concentrate of Example 3 #or additional impact resistance and 1 percent of a bis-stearamide wax. The properties of the resulting polymer are shown in Table 2.

EXAMPLE 5

Example 1 is substantially repeated with the exception that the main monomer feed stream contains 6.6 percent styrene, 15.3 percent acrylonitrile, 7.3 percent N-phenylmaleimide, 5.7 percent Diene 55 polybutadiene rubber and 15.2 percent ethylbenzene solvent. The second monomer stream is identical in composition to Example 1 and is added in equal amounts at main feed monomer conversion points of 0.3 and 0.4 at a total rate of 0.095 lb/hr (0.043 Kg/hr). The resulting graft copolymer is compounded with 19 percent of the grafted rubber concentrate of Example 3 for additional impact resistance and 1 percent of a bis-stearamide wax. The properties of the resulting polymer are shown in Table 2.

TABLE 2

| Experiment Number | Example 3 | Comparative Example 3-A | Comparative Example 3-B | Example 4 | Example 5 |
|---|---|---|---|---|---|
| Split N-PMI Addition* | Yes | No | Yes | Yes | Yes |
| Percent Rubber | 7.9 | 7.4 | 7.1 | 7.6 | 7.2 |
| Percent of total N-PMI added after phase inversion | 41.5 | 0 | 40.8 | 51.9 | 31 |
| Percent of total N-PMI in grafted/occluded copolymer phase | 19.9 | 23.4 | 24.9 | 18.4 | 19.7 |
| Percent of total N-PMI in matrix phase | 12.3 | 9.8 | 13.4 | 13.2 | 13.3 |
| Difference in N-PMI content between grafted/occluded copolymer and matrix copolymer | 7.6 | 13.6 | 11.5 | >5.2 | 6.4 |
| Izod Impact Strength (ft lb/in) | 5.29 | 2.33 | 3.14 | 4.56 | 4.80 |
| Room Temperature Dart Impact Strength (in-lb) | 199 | 172 | na | 225 | na |
| Low Temperature (−20°F.) Dart Impact Strength (in-lb) | 50 | 19 | na | 69 | na |
| Room Temperature Dart Impact Strength per Percent Rubber (in-lb/%) | 12.1 | 10.8 | na | 13.9 | na |

*Connotes that at least a portion of the N-PMI is added following rubber phase inversion.

As can be seen from the data in Table 2, compositions which have a N-PMI content difference of less than 9 percentage points as between the grafted/occluded copolymer portion and the matrix phase portion thereof exhibit substantially enhanced impact strength properties.

Comparative Example 4

Example 1 is substantially repeated with the exception of the main monomer feed stream contains 60.1 percent styrene, 15.0 percent acrylonitrile, 9.4 percent Diene 55 polybutadiene rubber and 15.5 percent ethylbenzene solvent. The second monomer stream is identical in composition to Example 1 and is added at a main monomer feed conversion point of 0.08 at a rate of 0.15 lb/hr (0.068 Kg/hr). The properties of the resulting polymer are shown in Table 3.

EXAMPLE 6

Example 1 is substantially repeated with the exception that the main monomer feed stream contains 60.3 percent styrene, 14.9 percent acrylonitrile, 9.5 percent Diene 55 polybutadiene rubber and 15.4 percent ethylbenzene solvent. The second monomer stream is identical in composition to Example 1 is added at conversion points of 0.08, 0.3 and 0.4. The total amount of this stream is 0.18 lb/hr (0.082 Kg/hr) and is added in equal amounts at the three conversion point locations. The properties of the resulting polymer are shown in Table 3.

EXAMPLE 7

Example 1 is substantially repeated with the exception that the main monomer feed stream contains 60.3 percent styrene, 14.9 percent acrylonitrile, 9.5 percent Diene 55 polybutadiene rubber and 15.4 percent ethylbenzene solvent. The second monomer stream is identical in composition to Example 1 and is added at conversion points of 0.08, 0.3 and 0.4 in amounts of 0.12, 0.03 and 0.03 lb/hr (0.055, 0.014 and 0.014 Kg/hr), respectively. The properties of the resulting polymer are shown in Table 3.

TABLE 3

| Experiment Number | Comparative Example 4 | Example 6 | Example 7 |
|---|---|---|---|
| Split N-PMI Addition* | No | Yes | Yes |
| Percent Rubber | 11.2 | 11.5 | 11.5 |
| Percent of total N-PMI added after phase inversion | 0 | 66.6 | 33.3 |
| Percent of total N-PMI in grafted/occluded copolymer phase | 20.3 | 13.2 | 15.3 |
| Percent of total N-PMI in matrix phase | 5.5 | 8.1 | 7.2 |
| Difference in N-PMI content between grafted/occluded copolymer and matrix copolymer | 14.8 | 5.1 | 8.1 |
| Izod Impact Strength (ft lb/in) | 2.10 | 2.30 | 2.42 |
| Room Temperature Dart Impact Strength (in-lb) | 102 | 183 | 146 |
| Low Temperature −20° F.) Dart Impact Strength (in-lb) | 99 | 70 | 75 |
| Room Temperature Dart Impact Strength per Percent Rubber | 9.1 | 15.9 | 12.7 |

*Connotes that at least a portion of the N-PMI monomer is added following rubber phase inversion.

As can be seen from the results in Table 3, substantially better room temperature Dart impact strength results are obtained when at least a portion of the maleimide monomer is added after rubber phase inversion thereby causing the maleimide monomer contents of the grafted/occluded copolymer and the matrix phase copolymer to be within 9 percentage points of each other.

EXAMPLE 8

Example 1 is substantially repeated with the exception that a styrene-butadiene diblock rubber (Stereon 730A) is used in place of the butadiene homopolymer rubber of Example 1. The properties of the resulting polymer are shown in Table 4.

Comparative Example 8

Comparative 1-A is also substantially repeated with the exception of using the Stereon 730A block copolymer rubber in place of Diene 55 butadiene homopolymer rubber. The properties of the resulting PO polymer are shown in Table 4.

TABLE 4

| Experiment Number | Example 8 | Comparative Example 8 |
|---|---|---|
| Split N-PMI Addition* | Yes | No |
| Percent Rubber | 11.8 | 11.9 |
| Percent of total N-PMI added after phase inversion | 66.6 | 0 |
| Percent of N-PMI in grafted/occluded copolymer phase | 10.7 | 14.5 |
| Percent of N-PMI in matrix phase | 3.9 | 4.7 |
| Difference in N-PMI content between grafted/occluded copolymer and matrix copolymer | 6.8 | 9.8 |
| Izod Impact Strength (ft lb/in) | 2.76 | 1.82 |
| Room Temperature | 197 | 106 |

TABLE 4-continued

| Experiment Number | Example 8 | Comparative Example 8 |
|---|---|---|
| Dart Impact Strength (in-lb) | | |
| Low Temperature (−20° F.) Dart Impact Strength(in-lb) | 112 | 76 |
| Room Temperature Dart Impact Strength per Percent Rubber | 16.7 | 8.9 |
| Swelling Index | 15 | 16 |

*Connotes post-phase inversion addition of at least a portion of the N-PMI monomer.

EXAMPLE 9

Example 1 is substantially repeated with the exception that the main monomer feed stream contains 57.8 percent styrene, 14.0 percent acrylonitrile, 12.7 percent Stereon 730A styrene-butadiene diblock rubber and 15.5 percent ethylbenzene solvent and is added at a rate of 0.89 lb/hr (0.405 Kg/hr). The second monomer stream is identical in composition to that of Example 1 and is added at main feed conversion points of 0.09, 0.3 and 0.55. The total amount of this stream is 0.18 lb/hr (0.082 Kg/hr) and is added in equal amounts at the three conversion point locations. The properties of the resulting polymer are shown in Table 5.

EXAMPLE 10

A modification to the process described in Example 1 results in the first and second stirred reactors being continuously recirculated (or "backmixed") at a rate of 21:1 (material being recirculated:fresh feed). The recirculation stream has monomer to polymer conversion of 41 percent and the main monomer feed stream to the recirculated reactors contains 48.3 percent styrene, 18.4 percent acrylonitrile, 10.6 percent Stereon 730A rubber, and 18.0 percent ethylbenzene, and 190 parts per million initiator, 1,1-bis(t-butyl peroxy)cyclohexane. The temperature of the recirculated reactors is maintained at 103° C. with stirring. Phase inversion of the freshly added feed is instantaneous. The third reactor, which is not recirculated, is maintained at a temperature of 130° C. The properties of the resulting polymer are shown in Table 5.

TABLE 5

| Experiment Number | Example 9 | Example 10 |
|---|---|---|
| Percent Rubber | 15.7 | 15.6 |
| Percent of total N-PMI added after phase inversion | 66.7 | 100 |
| Percent of Total N-PMI in grafted/occluded copolymer phase | 11.4 | 12.1 |
| Percent of total N-PMI in matrix phase | 7.7 | 7.5 |
| Difference in N-PMI content between grafted/occluded copolymer and matrix copolymer | 3.7 | 4.6 |
| Izod Impact Strength (ft lb/in) | 3.2 | 1.9 |
| Room Temperature Dart Drop Impact Strength (in-lb) | 330 | 230 |
| Low Temperature (−20° F.) Dart Impact Strength (in-lb) | 116 | 33 |
| Room Temperature Dart Impact Strength per percent Rubber (in-lb per %) | 21 | 14.7 |
| Swelling Index | 19.5 | 12.5 |

As can be seen from the results in Table 5, the resin prepared using the recirculation or backmixing technique of Example 10 resulted in a resin having a difference of only 4.6 percent as between the N-PMI content of the grafted/occluded copolymer and the matrix phase. It can also be seen, however, that utilization of the split feed/post phase inversion N-PMI addition in the context of a plug flow (non-backmixed) graft polymerization process provided relatively tougher final product having notably better Izod impact strength and Dart impact strength characteristics.

While the present invention has been described and illustrated with reference to certain specific and preferred embodiments thereof, such is not to be interpreted as in any way restricting or limiting the scope of the instantly claimed invention.

What is claimed is:

1. A rubber-modified monovinylidene aromatic copolymer composition which comprises:
   A. a continuous phase matrix copolymer comprising, in polymerized form and on a matrix copolymer weight basis, from about 35 to about 89 weight percent of a monovinylidene aromatic monomer, from about 10 to about 40 weight percent of an ethylenically unsaturated nitrile monomer, and from about 1 to about 25 weight percent of an N-substituted maleimide monomer; and
   B. dispersed within said matrix copolymer, discrete particles of a conjugated diene homopolymer or copolymer rubber having grafted thereon and occluded therein a rigid copolymer constituent comprising, in polymerized form and on a rigid copolymer constituent weight basis, from about 25 to about 94 weight percent of a monovinylidene aromatic monomer, from about 5 to about 40 weight percent of an ethylenically unsaturated nitrile monomer, and from about 1 to about 35 weight percent of a N-substituted maleimide monomer; said rubber-modified monovinylidene aromatic copolymer composition being further characterized in that it has a swelling index value of from about 15 to about 25 and in that the difference between the N-substituted maleimide monomer content of the matrix phase copolymer and that of the grafted and occluded rigid copolymer constituent is 9 weight percentage points or less.

2. The aromatic copolymer composition of claim 1 wherein the N-substituted maleimide monomer of both matrix copolymer and the grafted and occluded rigid copolymer is an N-aryl maleimide.

3. The aromatic copolymer composition of claim 2 wherein the N-aryl maleimide is N-phenyl maleimide.

4. The aromatic copolymer composition of claim 3 wherein, in both the matrix copolymer and the grafted and occluded copolymer, the monovinylidene aromatic monomer is styrene and the ethylenically unsaturated nitrile is acrylonitrile.

5. The aromatic copolymer composition of claim 1 wherein the difference between the N-substituted maleimide content of the matrix phase and the N-substituted maleimide content of the grafted and occluded rigid copolymer is 8 weight percentage points or less.

6. The aromatic copolymer composition of claim 1 wherein the swelling index thereof is from about 15 to about 20.

7. The aromatic copolymer composition of claim 1 wherein the rubber content thereof is from about 5 to about 30 percent based upon the total weight of said composition.

8. The aromatic copolymer composition of claim 1 wherein said composition has been prepared by a mass, solution or mass/suspension polymerization process.

9. The aromatic copolymer composition of claim 8 wherein said composition further comprises, on a total composition weight basis, from about 5 to about 40 weight percent of an emulsion graft polymerized rubber concentrate which comprises, on a rubber concentrate weight basis, from about 30 to about 70 weight percent of dispersed rubber particles having grafted thereto a rigid superstrate polymer comprising, in polymerized form, a monovinylidene aromatic monomer, an ethylenically unsaturated nitrile monomer and, optionally, an N-substituted maleimide monomer.

* * * * *